(12) United States Patent
Hasegawa

(10) Patent No.: US 11,449,092 B2
(45) Date of Patent: Sep. 20, 2022

(54) ELECTRONIC DISPLAY DEVICE AND DISPLAY CONTROL METHOD

(71) Applicant: CASIO COMPUTER CO., LTD., Tokyo (JP)

(72) Inventor: Kosuke Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 359 days.

(21) Appl. No.: 16/824,129

(22) Filed: Mar. 19, 2020

(65) Prior Publication Data

US 2020/0310486 A1    Oct. 1, 2020

(30) Foreign Application Priority Data

Mar. 25, 2019  (JP) .............................. JP2019-056212

(51) Int. Cl.
| | |
|---|---|
| *G06F 1/00* | (2006.01) |
| *G06F 1/12* | (2006.01) |
| *G06F 1/16* | (2006.01) |
| *G04G 21/02* | (2010.01) |
| *G04G 9/00* | (2006.01) |
| *G06F 1/14* | (2006.01) |

(52) U.S. Cl.
CPC ............. *G06F 1/12* (2013.01); *G04G 9/0082* (2013.01); *G04G 21/02* (2013.01); *G06F 1/14* (2013.01); *G06F 1/163* (2013.01)

(58) Field of Classification Search
CPC ... G06F 1/12; G06F 1/14; G06F 1/163; G06F 3/1454; G04G 9/0082; G04G 21/02; G04G 9/12; G04F 1/005; G04F 10/00

USPC .......................................................... 702/173
See application file for complete search history.

(56) References Cited

U.S. PATENT DOCUMENTS

| | | | | |
|---|---|---|---|---|
| 6,041,067 | A | * | 3/2000 | Takamori ......... H04N 21/44004 348/464 |
| 11,200,681 | B2 | * | 12/2021 | Chan ....................... G06T 7/254 |
| 11,300,402 | B2 | * | 4/2022 | Winkelbach ....... G01B 11/2513 |
| 2003/0151982 | A1 | * | 8/2003 | Brewer ............... H04M 1/2757 368/46 |
| 2004/0090455 | A1 | * | 5/2004 | Iida ........................ G10H 1/368 715/728 |
| 2005/0030299 | A1 | * | 2/2005 | Bursill ................. H04N 21/431 345/475 |

(Continued)

FOREIGN PATENT DOCUMENTS

| | | |
|---|---|---|
| JP | S56-110380 U | 8/1981 |
| JP | S56-168586 U | 12/1981 |

(Continued)

*Primary Examiner* — Volvick Derose
(74) *Attorney, Agent, or Firm* — Scully Scott Murphy & Presser

(57) ABSTRACT

An electronic display device includes measurement sensors that measure respective items, a digital display that displays the items, and a processor. The processor determines a main image related to a measurement of at least one of the items and updates a screen at first timing. Upon displaying the main image related to a measurement of an item other than the first item on the digital display, the processor determines that a sub image is related to measurement of the first item, synchronizes the first timing with update timing that is related to the main image, and simultaneously updates the main image and the sub image.

20 Claims, 5 Drawing Sheets

(56) References Cited

U.S. PATENT DOCUMENTS

| | | | | |
|---|---|---|---|---|
| 2005/0151849 A1* | 7/2005 | Fitzhugh | G04G 5/00 | 348/207.99 |
| 2009/0244310 A1* | 10/2009 | Kuwazoe | H04N 5/2258 | 348/222.1 |
| 2010/0162130 A1* | 6/2010 | Toda | G06F 1/3218 | 715/747 |
| 2010/0245270 A1* | 9/2010 | Nako | H04N 1/00129 | 345/173 |
| 2010/0266160 A1* | 10/2010 | Yamada | H04N 1/2133 | 348/E5.042 |
| 2010/0296370 A1* | 11/2010 | Holmes | G04F 1/005 | 368/73 |
| 2011/0032387 A1* | 2/2011 | Takahashi | H04N 9/8227 | 348/E5.024 |
| 2011/0187742 A1* | 8/2011 | Tsai | G09G 5/00 | 345/629 |
| 2011/0254920 A1* | 10/2011 | Yun | H04N 21/238 | 348/E13.001 |
| 2012/0212484 A1* | 8/2012 | Haddick | G06Q 30/02 | 345/419 |
| 2012/0218175 A1* | 8/2012 | Uemura | G09G 3/3406 | 345/102 |
| 2013/0329040 A1* | 12/2013 | Willemin | G04D 7/004 | 348/135 |
| 2014/0029923 A1* | 1/2014 | Hirono | H04N 7/013 | 386/343 |
| 2014/0240587 A1* | 8/2014 | Cote | H04N 5/2256 | 348/371 |
| 2015/0103190 A1* | 4/2015 | Corcoran | H04N 5/23219 | 348/208.2 |
| 2015/0325019 A1* | 11/2015 | Sukeno | H04N 21/44016 | 345/634 |
| 2016/0011004 A1* | 1/2016 | Matsumoto | G01C 22/006 | 702/96 |
| 2016/0088209 A1* | 3/2016 | Tanaka | H04N 5/0733 | 348/211.8 |
| 2017/0078740 A1* | 3/2017 | Iwami | H04N 21/6587 | |
| 2017/0324888 A1* | 11/2017 | Boone | H04N 5/232061 | |
| 2017/0359515 A1* | 12/2017 | Harris | G06K 9/00 | |
| 2020/0310486 A1* | 10/2020 | Hasegawa | G06F 1/14 | |
| 2021/0016159 A1* | 1/2021 | Jung | A63F 7/06 | |
| 2021/0272535 A1* | 9/2021 | Takahashi | G04G 9/06 | |
| 2021/0319770 A1* | 10/2021 | Park | G09G 3/20 | |
| 2022/0087547 A1* | 3/2022 | Otsuka | H04N 5/2353 | |
| 2022/0099499 A1* | 3/2022 | Guillon | H04N 5/23299 | |

FOREIGN PATENT DOCUMENTS

| | | |
|---|---|---|
| JP | H1-217290 A | 8/1989 |
| JP | H7-55964 A | 3/1995 |

\* cited by examiner

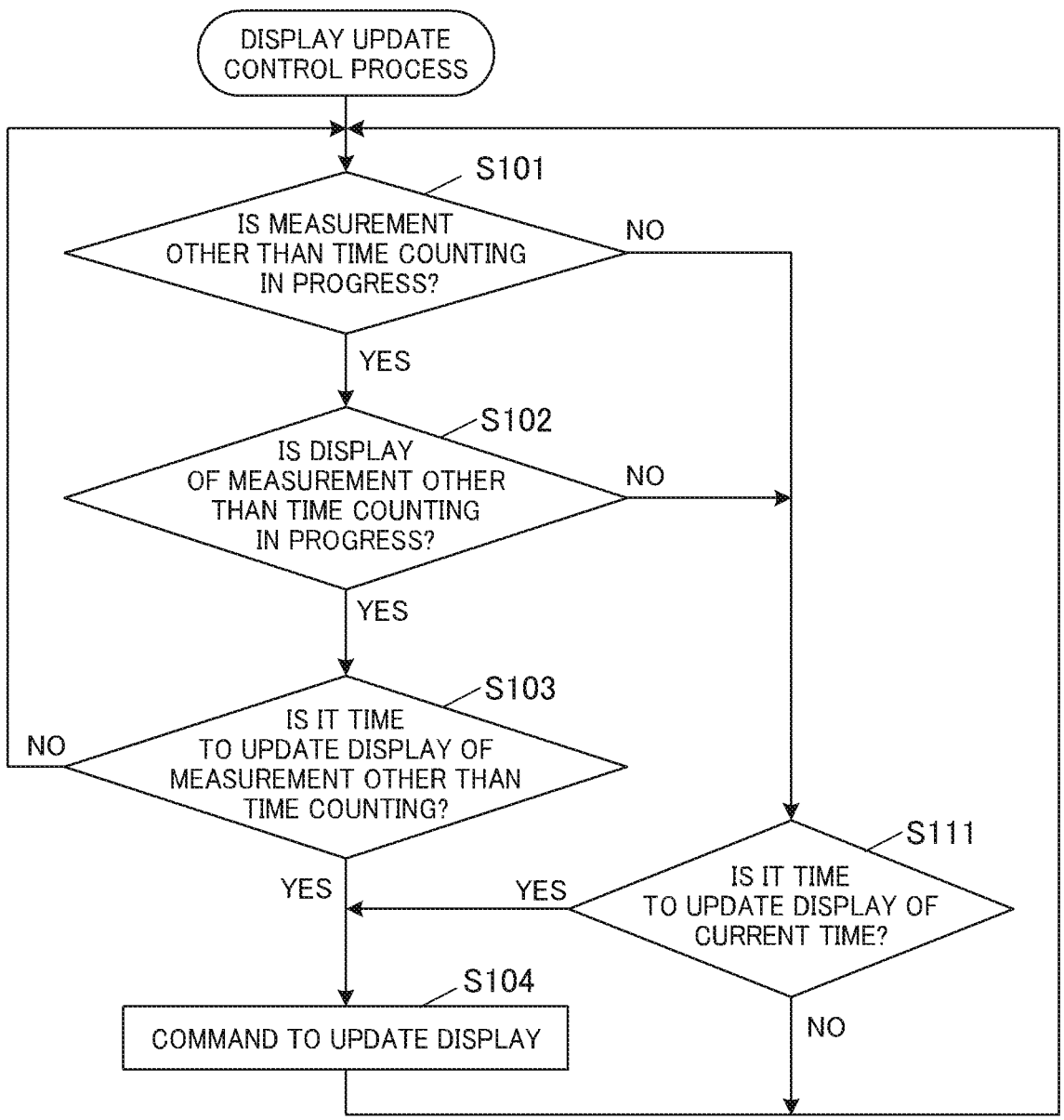

ELECTRONIC DISPLAY DEVICE AND DISPLAY CONTROL METHOD

CROSS-REFERENCE TO RELATED APPLICATION

This application is based upon and claims the benefit of priority from the prior Japanese Patent Application No. 2019-056212, filed on Mar. 25, 2019, the entire contents of which are incorporated herein by reference.

BACKGROUND

The technical field relates to an electronic display device and a display control method.

There are electronic display devices that are capable of digitally displaying a plurality of measurement values. The measurement values include those related to time such as the current time, elapsed time, and remaining setting time of a timer, and those related to spatial physical quantities such as atmospheric pressure, direction, tilt angle, and the like.

Depending on the measurement situation, a plurality of measurement values may be desired to be visually recognized at the same time. JP h7-55964 A discloses a technique of displaying altitude based on barometric pressure measurement and elapsed time based on measurement with a stopwatch in parallel on one screen.

SUMMARY

According to an aspect of the present invention, there is provided an electronic display device, including:
measurement sensors that measure respective items;
a digital display that displays the items; and
a processor that determines a main image related to a measurement of at least one of the items and updates a screen at first timing, wherein,
upon displaying the main image related to a measurement of an item other than the first item on the digital display, the processor determines that a sub image is related to measurement of the first item, synchronizes the first timing with update timing that is related to the main image, and simultaneously updates the main image and the sub image.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 5 is a flowchart of control procedures in a display update control process.

DETAILED DESCRIPTION OF THE PREFERRED EMBODIMENTS

Hereinafter, one or more embodiments will be described on the basis of the drawings.

Figure 1:
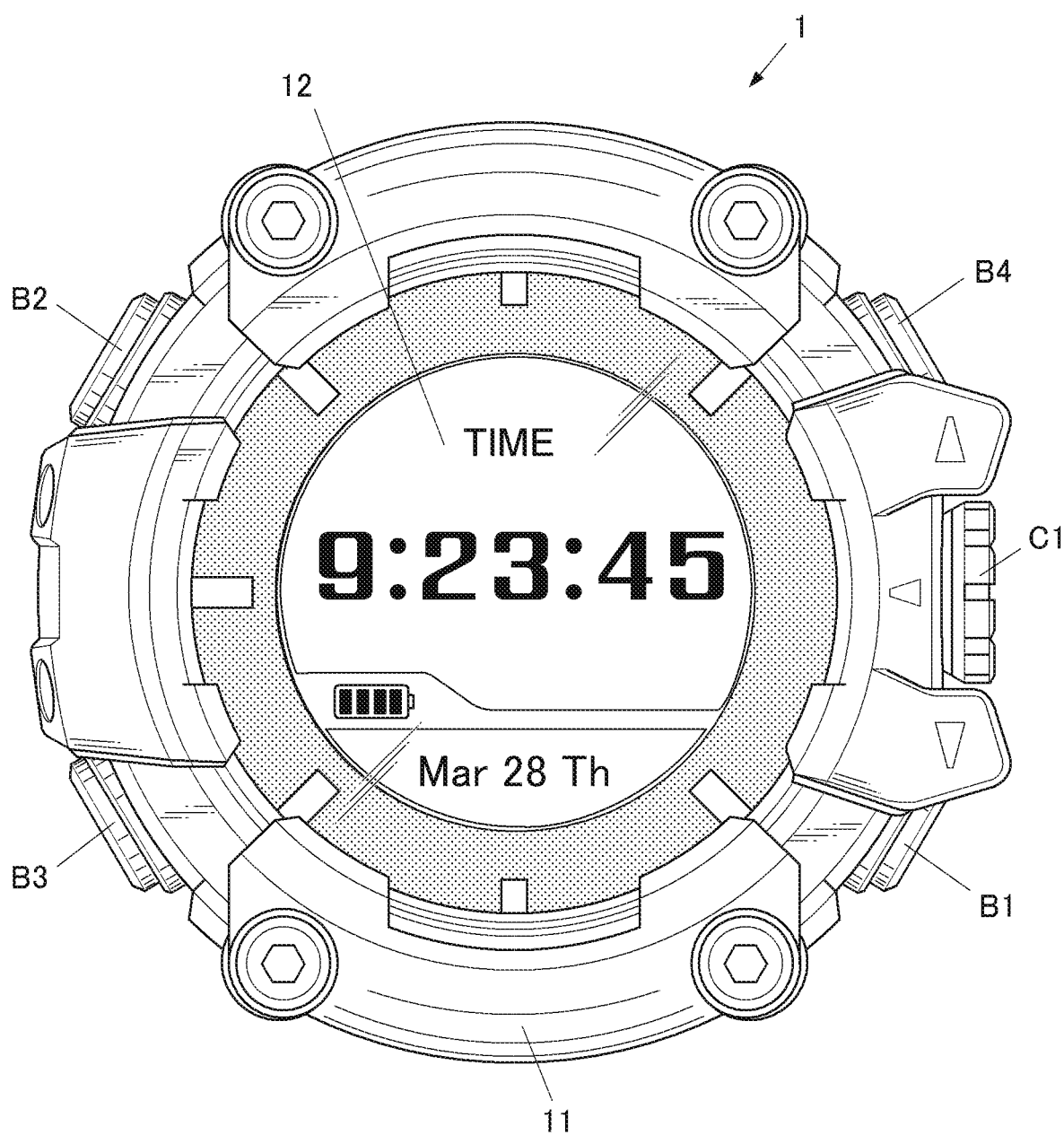
FIG. 1 is a front view of an electronic timepiece.

FIG. 1 is a front view of an electronic timepiece 1 as an electronic display device of this embodiment.

The electronic timepiece 1 includes a case 11, a display screen 12, push button switches B1 to B4, a crown C1, and the like. The upper portion of the display screen 12 may be covered with a windshield glass or the like.

The case 11 has, for example, a cylindrical shape with both sides opened, and the display screen 12 is provided at one of the sides, and the other side is sealed with a lid (not shown). A substrate, chip, sensor, electronic component, battery, and the like having configuration for various operations are located inside the case 11 between the display screen 12 and the lid.

The display screen 12 is a digital display screen of a dot matrix type. In this embodiment, in the display screen 12 can be displayed not only numerals and symbols related to the current time, but various characters, a drawing(s) indicating a charge state of the battery, and the like. A font, arrangement, and the like can be individually set and changed in each screen.

The push button switches B1 to B4 and the crown C1 penetrate the case 11 outward from the inside where these components are each positioned, so as to accept respective external operations by a user or the like. Each of the push button switches B1 to B4 outputs, as an input signal, an electric signal corresponding to a pressing operation. The crown C1 outputs, as an input signal, electric signals each corresponding to a pull-out/push-in operation and a rotation operation.

Figure 2:
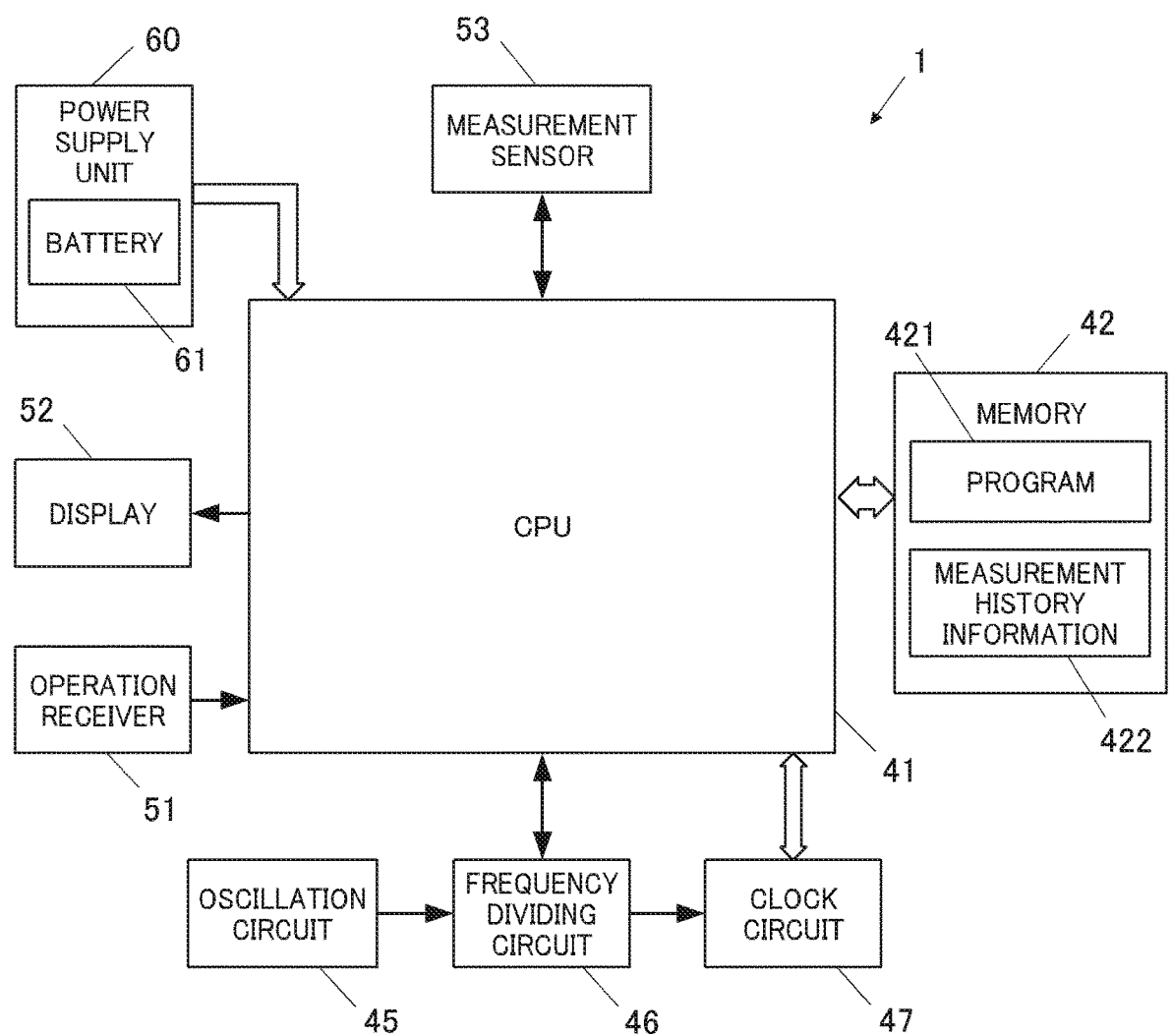
FIG. 2 is a block diagram showing functional configuration of the electronic timepiece.

FIG. 2 is a block diagram showing functional configuration of the electronic timepiece 1.

The electronic timepiece 1 includes a CPU (Central Processing Unit) 41 (processor), a memory 42, an oscillator circuit 45, a frequency dividing circuit 46, a clock circuit 47 (time counter), an operation receiver 51, a display 52, a measurement sensor 53, a power supply unit 60, and the like.

The CPU 41 is a processor that performs various types of arithmetic processing, and integrally controls operations of each component of the electronic timepiece 1. The CPU 41 reads and executes programs 421 stored in the memory 42, thereby performing various control operations. The CPU 41 can switch the contents displayed on the display screen 12 based on the operation content received by the operation receiver 51, and can start, pause, stop, and finish various measurements. The contents to be measured include, in addition to those measured by each sensor of the measurement sensor 53 described later, elapsed time based on the stopwatch function, and remaining time until the set period elapses (or until the set time) based on the timer function. The stopwatch function and the timer function are collectively referred to as a time measurement function.

The memory 42 provides the CPU 41 with a memory space for work, and stores various kinds of data. The CPU 41 includes, for example, a RAM (Random Access Memory) and a nonvolatile memory. The RAM is used by the CPU 41 to perform the arithmetic processing, and stores temporary data. The nonvolatile memory is a flash memory, for example, and stores various settings, programs 421, and the like.

The memory 42 stores measurement history information 422. The measurement history information 422 includes a measurement result obtained by the measurement sensor 53. For example, the information during the measurement may be stored in the RAM, and then stored in the nonvolatile memory after completion of the measurement.

The oscillation circuit 45 generates a clock signal having a predetermined oscillation frequency, for example, 32.768 kHz, and outputs the clock signal to the frequency dividing circuit 46. The frequency dividing circuit 46 performs frequency division of the clock signal input from the oscillator circuit 45 to convert the clock signal into a signal of a frequency that is necessary for each component of electronic timepiece 1 to operate, and outputs the converted signal. The signal generated by the frequency dividing circuit 46 is output to the clock circuit 47 and the like. In the elapsed time measurement based on the stopwatch function and the like, the high frequency signal output from the frequency dividing circuit 46 is counted, for example, in the unit of 1/100 second or the like. A time measurement sensor of this embodiment includes the frequency dividing circuit 46 and the CPU 41.

The clock circuit 47 processes a signal of a predetermined frequency that is input from the frequency dividing circuit 46, and obtains and holds the current date and time. The format of the date and time held by the clock circuit 47 is not limited to a format represented by year, month, day, hour, minute, and second, but may be an appropriate format suitably processed by the CPU 41 and the like. Because the oscillation frequency of the oscillation circuit 45 slightly changes depending on the external environment such as a temperature, the date and time obtained by the clock circuit 47 in a normal environment may have an error (clock drift) of 0.5 seconds in a day at the maximum, for example. The electronic timepiece 1 may be provided with a communication unit and/or a radio wave receiving unit (not shown) to obtain an accurate date and time from the outside, so as to correct for the error in the date and time obtained by the clock circuit 47.

The operation receiver 51 receives an input operation by a user from outside, and outputs input signals corresponding to the input operation to the CPU 41. In this embodiment, the operation receiver 51 has the above-described push button switches B1 to B4, crown C1, and the like. The operation receiver 51 may have a touchscreen overlaid with the display screen of the display 52.

The display 52 performs a display operation based on the control of the CPU 41, that is, a digital display operation on the display screen 12. The display screen 12 is of a dot matrix type as described above, in which a memory type liquid crystal can maintain a content once displayed thereon without frequent update maintenance operations (refreshing). In this embodiment, the display screen 12 has a display with a memory-in-pixel (MIP) liquid crystal.

The measurement sensor 53 measures a physical quantity of a predetermined item, and outputs measurement results (measurement values) to the CPU 41. The measured physical quantity includes at least one of an atmosphere, orientation (magnetic north), acceleration, and gravitational direction (gravitational acceleration), for example. The measurement sensor 53 has sensors corresponding to the respective items to be measured. Measurement values of a physical quantity of the item to be measured are obtained regularly (at predetermined time intervals in many cases), and are corrected or converted into values to be displayed as needed. The correction and conversion may be performed by the measurement sensor 53 or may be performed by the CPU 41. Table data for correction and/or conversion may be stored in the memory 42. The content of the display related to the measurement is not necessarily the measurement value itself, but may be the value corrected and/or converted as described above.

The CPU 41, the frequency dividing circuit 46, the clock circuit 47, and the measurement sensor 53 are included in the measurement sensor of this embodiment. The measurement sensor as a whole can measure a plurality of items including the date and time, amount of time measured based on the stopwatch function, and the like.

The power supply unit 60 supplies power at a predetermined operating voltage from the battery 61 to each unit of the electronic timepiece 1 (maybe indirectly via the CPU 41 or the like). The battery 61 includes, for example, a solar panel and a storage cell. The battery 61 may be a removable dry cell, a button cell, or the like. Alternatively, the battery 61 may be a secondary cell such as a lithium ion cell, that is charged using a predetermined cable or via a connection terminal. The power supply unit 60 can measure the output voltage of the battery 61, and regularly outputs the measurement value to the CPU 41. The CPU 41 can estimate the remaining power of the battery 61 based on the measurement value.

Hereinafter, the display operation according to this embodiment will be described. In the electronic timepiece 1 of this embodiment, as shown in FIG. 1, the current time is usually displayed as a first item and updated every second (at first timing). During a measurement of each item other than a measurement of the current time (the first item), the screen related to the measurement and the current time screen are displayed simultaneously and in parallel. When a plurality of screens are updated in parallel in this way, the screen related to one measurement is set as "a main image" and the screen related to the other measurement is set as "a sub image" in the electronic timepiece 1. The main image may be displayed more largely than the sub image, for example, or may be colored to be emphasized, and the like.

FIG. 3A, FIG. 3B, FIG. 3C, FIG. 4A and FIG. 4B each show an example the display screen 12 including a screen based on the stopwatch function.

Figure 3A:
FIGS. 3A, 3B, and 3C are diagrams each showing an example of a display screen related to a stopwatch function.

FIG. 3A shows an example of the display screen 12 before start of the measurement or in a state where the measurement result has been reset after completion of the measurement. In FIG. 3A, the notation of "STOPWATCH" shows the function mode, the numerals of "0", "00", and "00" in the center respectively shows the hour, minute, and second of the initial measurement time, and the numerals "5" and "53" in the lower portion (below the screen of the measurement time) respectively shows the hour and minute of the current time.

Furthermore, the character and symbol """ respectively represent the hour and minute of the measurement time, and the symbol ":" is displayed between the numerals indicating the hour and the minute of the current time. A battery indicator representing the charge state of the battery is displayed between the measurement time and the current time. The symbol ":" blinks (repeats appearing for one second and disappearing for one second alternately) at the exact start timing of each second of the current time, and thus represents elapse of the time. When a value of minute or more changes, the displayed numeral is also updated. Because a clocking operation is not performed (stopped) in FIG. 3A, the screen of the measurement time is the sub image. Therefore, the screen related to the current time is the main image, and the screen related to the elapsed time is set to be the sub image. In the screen related to the current time, which is the main image, the symbol ":" blinks every minute in real time, and the value of minute or more is updated when the value of second is zero.

Figure 3B:
Figure 3C:

FIG. 3B and FIG. 3C each show an example of the display screen 12 including a screen during the measurement of the elapsed time. When the elapsed time measurement is started, the elapsed time screen is updated every time when the elapsed time increases by one second (referred to as an update time unit that is shorter than a display time unit described later). At the same time, the symbol """ may be turned on and off (appear and disappear) every second. During the measurement of the elapsed time (during display related to the measurement(s) other than the current time), in many cases, the measurement time (display related to the measurement other than the current time) is more important for the user than the current time. Therefore, it is determined that the screen of the measurement time is the main image, and the screen of the current time is the sub image. In such cases, the measurement time is displayed in real time. That is, the elapsed time screen is updated at the exact start timing of each second of the elapsed time. Numerals indicating the unit of minute or more are updated at zero second in every minute (the display time unit).

In the screen of the current time as a sub image, the display of the symbol ":" and switching of the numeral(s) of the minute value or more are each synchronized with the update timing of the elapsed time screen as the main image. That is, the main image and sub image are updated simultaneously. The actual start timing of each second of the current time is usually different from the start timing of each second of the elapsed time based on the stopwatch function. Therefore, the update timing of the current time screen is slightly different from the actual start timing of each second of the current time. The update timing of the current time screen is delayed by less than one second when synchronized with the subsequent update timing of the elapsed time screen, and the update timing of the current time screen has an error in the range of ±0.5 seconds when synchronized with the nearest update timing of the elapsed time screen. The mark "P" in the drawings indicates that it is currently in the afternoon. Alternatively, the update timing of the current time screen may be synchronized with the latest update timing of the elapsed time screen and brought forward by less than one second, such that a problem does not occur due to the delay in the update. The symbols ":" and """ (predetermined marks) simultaneously appear (FIG. 3B) and then simultaneously disappear (FIG. 3C) (perform a blinking operation).

Figure 4A:
FIGS. 4A and 4B are diagrams each showing an example of a display screen related to a stopwatch function.
Figure 4B:

When the split time or the lap time is measured based on the stopwatch function, the update of the screen is temporarily paused for the elapsed time which is an item during the measurement. In such a case, a mark "SPL" is displayed as shown in FIG. 4A and FIG. 4B, for example, to represent that the split time is now displayed. Furthermore, continuation of the elapsed time measurement is represented by the symbol """ blinking every second (disappearing in FIG. 4B) during the continuation. In such a situation, the "current time" that is being measured and displayed is switched to the main image, and the "elapsed time" to the sub image. That is, the current time screen is updated in real time, and the blinking of the symbol """ in the elapsed time screen is synchronized with the exact start of every second of the current time. In this case, the update timing of the elapsed time screen (that is, the blinking timing of the symbol """) is delayed by less than one second or has an error in the range of ±0.5 seconds.

Each of the symbols ":" and """ appears and disappears at odd seconds and at even seconds. Depending on the correspondence between the value of a second in the current time and the value of a second in the elapsed time, the symbols ":" and """ may appear and disappear simultaneously or may appear alternately. Alternatively, regardless of the correspondence, the symbols may appear/disappear simultaneously.

The operations and display in the measurement of the remaining time based on a timer function are equivalent to those in the measurement of the elapsed time based on the above-mentioned stopwatch function. The measurement related not to time but to a spatial physical quantity is sometimes performed equal to or more than once a second, and the screen is desired to be updated immediately after the measurement (a long response time is desired to be avoided). For example, the update frequency may be more than once a second when the main image may not be the current time screen but a screen of a compass based on a result of a magnetic field measurement. The more the update frequency is, the less the degree of improvement in efficiency related to the display operation is. Therefore, an upper limit of the update frequency (for example, 10 times or less per second) may be determined depending on the required efficiency.

FIG. 5 is a flowchart showing control procedures by the CPU 41 in a display update control process performed in the electronic timepiece 1 of this embodiment. This display update control process is performed according to the display control method of this embodiment, and is continuously performed from activation of the electronic timepiece 1 as long as the display state is maintained.

When the display update control process is started, the CPU 41 determines whether or not a measurement other than time counting is in progress (step S101). During the above-described reset state, the standby state of one second or more in the measurement intervals, or the like, it is not determined that the measurement other than the time counting is in step S101. If it is determined that the measurement other than time counting is not in progress ("NO" in step S101), the CPU 41 then proceeds to step S111.

If it is determined that the measurement other than time counting is in progress ("YES" in step S101), the CPU 41 determines whether or not the content during the measurement is being displayed (step S102). In step S102, the content during the measurement and determined to be displayed does not include the content for which the measurement has been completed, such as the split time and the lap time described above. The content during the measurement and determined to be displayed includes the display of each measurement result that is measured or acquired continuously or discretely at intervals of one second or less.

If it is determined that the content during the measurement is not being displayed ("NO" in step S102), the CPU 41 then proceeds to step S111. If it is determined that the content during the measurement is displayed ("YES" in step S102), the CPU 41 determines whether or not it is time to update the screen related to the measurement other than time counting (step S103). If it is determined that it is not time to update the screen ("NO" in step S103), the CPU 41 returns to step S101. If it is determined that it is time to update the screen ("YES" in step S103), the CPU 41 generates display data and outputs, to the display 52, a command to update the screen using the generated display data (step S104). As described above, the display data is obtained by synchronizing displaying of the current time screen and displaying of the screen of the measurement other than time counting. When the generated display data is the same as the previous display data, the display data is not necessarily output to the display 52. The processes of steps S101, S103 and S104 constitute an updating control step in the display control method of this embodiment. The CPU 41 then returns to step S101.

When proceeding from step S101 or S102 to step S111, the CPU 41 determines whether or not it is time to update the current time screen (step S111). If it is determined that it is not time to update the current time screen ("NO" in step S111), the CPU 41 returns to step S101. If it is determined that it is time to update the current time screen ("YES" in step S111), the CPU 41 proceeds to step S104. The processes of steps S111 and S104 constitute an update step in the display control method of this embodiment.

As described above, the electronic timepiece 1 which is the electronic display device of this embodiment has the measurement sensors (the measurement sensor 53, the frequency dividing circuit 46, and the clock circuit 47) capable of measuring a plurality of items, the display 52 that is a digital display, and the CPU 41 that determines that a screen related to a measurement of at least one first item (in many cases, at least the current time) among the plurality of items to be displayed on the display 52 is the main image and then updates the screen every second. When displaying a main image related to the measurement of an item other than the first item (current time) on the display 52, the CPU 41 determines that the screen related to the measurement of the first item is the sub image and synchronizes the update timing of the sub image (first timing) with the update timing of the main image. As a result, in the electronic timepiece 1, the main image is updated at the same time as the sub image.

As described above, when all the screens are updated at the update timing determined for the main image, it is possible to reduce power consumption and processing load by the less update frequency and to cause the electronic timepiece 1 to efficiently perform the display operation.

Furthermore, the measurement sensor has the clock circuit 47 that obtains the current time as the first item to be measured, and it is determined that the current time screen is the sub image while a screen related to a measurement other than time counting is displayed.

That is, when a user has started the measurement and displaying of a screen related to a measurement item(s) other than the current time, the information on the current time may be necessary but is not likely to be as important as the information on the measurement item(s) other than the current time. Therefore, a time lag of about less than one second hardly causes a problem to the user. As a result, when the update timing of the current time screen is synchronized with that of the screen related to the other measurement item(s), it is possible to reduce occurrence of a problem or a sense of discomfort due to the display and to perform more efficient display, thereby improving user-friendliness.

The measurement is performed at an interval of one second or less (equal to or more than once a second) for the item as the main image. That is, the frequency of the measurement and update of the main image is sufficient as compared with that of the measurement and update of the current time screen. Therefore, even though displayed and updated in synchronization with the update timing of the main image, the current time can be displayed with a sufficiently small time lag, as small as the counting error of a generally-used clock circuit 47. As a result, it is possible to improve the efficiency of the display operation while occurrence of a problem due to the time lag of displaying can be suppressed.

Furthermore, the measurement sensor has the CPU 41 and the frequency dividing circuit 46 as a time measurement sensor that measures the elapsed time as an item to be measured. The CPU 41 determines that the elapsed time screen is the main image during measurement of the elapsed time based on the outputs from the frequency dividing circuit 46, and determines that the elapsed time screen is the sub image during stopping of measurement of the elapsed time. That is, even in the display screen related to a function for measuring the elapsed time (for example, the stopwatch function or timer function), the screen of the elapsed time or the remaining time of the timer is the sub image while the measurement is not performed, so that the screen (s) related to other measurement (s) can be appropriately displayed in real time without a time lag. Because a user frequently stares at the elapsed time screen and thereby has a problem or feels a sense of discomfort due to the time lag related to the elapsed time screen, the elapsed time screen may be preferentially the main image during the measurement of the elapsed time. With flexible determination in this way, the display operation can be more efficient as appropriate.

Furthermore, the CPU 41 updates spelled-out numerals in each of the elapsed time screen and the current time screen every minute, and causes each of the symbol ":" and the symbol "" to blink more frequently, that is, every second. The spelled-out numerals are updated less frequently than the blinking symbols in such a case. When update of the elapsed time screen is synchronized with update of the current time screen, the display operation can be performed more efficiently without causing discomfort for the user. In particular, since the symbols are not often used for purposes other than indicating that the measurement is being performed, there is almost no problem even though the blinking does not synchronize with the timing corresponding to the measured data.

When pausing update of the screen related to an item as the main image during the measurement of the item, the CPU 41 switches the screen related to the item during the measurement to the sub image. That is, even during the measurement of an item displayed as the main image, the CPU 41 may switch the main image and the sub image temporarily or display the progress. For example, the screen related to the item during the measurement (that is, the screen showing the progress) may be switched to the sub image, which results in displaying of the screen related to the item during the measurement not in real time. This improves real-time properties and decreases the time lag of the screen depending on the actual display conditions and thereby user convenience.

Furthermore, according to the display control method including the update control step of synchronizing the update timing of a plurality of measurements as described above, it is possible to reduce the update frequency without causing a serious problem related to the display. This reduces power consumption, reduces processing load, and improves efficiency in the display operation.

The present invention is not limited to the above embodiment, and can be variously modified.

For example, in the above embodiment, the current time screen and the screen(s) of other measurement(s) (for example, the elapsed time screen) are displayed in combination, but the present invention is not limited to this. The update timing can also be synchronized with the main image when multiple screens each related to the elapsed time are displayed in combination, one elapsed time screen based on the stop watch function and a remaining-time screen based on the timer function are displayed in combination, an elapsed-time screen and a screen related to the measurement of another space physical quantity are displayed in combination, or the like. In such cases, the update of the screen related to the spatial physical quantity measurement may be synchronized with the update of the current time screen or the main image that may be the elapsed time screen or the remaining-time screen. That is, the spatial physical quantity measurement may be controlled so as not to be the item for the main image but to be included in the plurality of the first items together with the current time.

The value of the minute is spelled out but the value of the second is not spelled out in the above embodiment, however, the value of the second may be spelled out. Alternatively, the value of the second may be spelled out and displayed only in the main image. That is, only the numeral that changes at each update timing may be explicitly displayed. The update interval related to the main image is not limited to be one second or less, but may be longer than one second as long as there is no significant problem in visual recognition of the sub image. The measurement used as the main image may be selected depending on the display update frequency required for the sub image.

In the above embodiment, the current time screen is switched to the main image during measurement of an item that is not being displayed in real time, for example, during displaying of the split time or the lap time. However, such switching may not be always performed. For example, if it is determined that real time display is always paused for a short time, such switching may not be made.

In the above embodiment, the current time is always displayed as the sub image during measurement and displaying related to an item(s) other than the current time. However, the current time may be continued to be displayed as the main image when the measurement and displaying relates to a spatial physical quantity or the like, which leads to no problem even when displayed with a delay of about one second after the measurement. Alternatively, while the current time screen is the sub image so that the mark ":" therein blinks with a time lag, the current time screen may be temporarily switched from the sub image to the main image every minute so that the spelled out numerals related to the minute value and the like therein can be updated without a time lag.

The blinking mark is not limited to the symbol ":" or """ but may be a different blinking symbol or mark (for example, a mark having a circle shape or triangle shape) at the same position as or different position from the position of the symbol ":" or """. Instead of a simply blinking mark, for example, a mark may change its own positions alternately or may move around in a predetermined cycle.

When a user desires to update a screen in real time regarding a content not frequently measured or changing, the screen may be updated at any arbitrary time whether it is the main image or the sub image.

In the above embodiment, one of the two screens related to respective measurements is the main image, and the other is the sub image. When there are three or more screens related to respective measurements, it may be determined that one is the main image, and all the others are the sub images. In such a case, priority levels may be determined for the respective measurements, and, among the screens each related to an item during the measurement and display, the screen corresponding to the highest priority level may be determined as the main image. Alternatively, the three or more screens may include two or more main images, and all the screens may be updated every time when the content related to any of the main images changes. The efficiency of the display operation can be improved as the display update related to the content(s) set as the sub image(s) is synchronized with the update of the main images.

Other than the memory-type liquid crystal display screen of the above embodiment, a display screen having a memory function of display contents may be used, for example, a display screen of an electrophoretic type used for electronic paper. When the display screen is not of a memory-type, the update timing of the sub image is synchronized with that of the main image so that the frequency of generating display data can be reduced. As a result, the load of processing related to generation of the image data can be reduced.

Although the electronic timepiece is described as an example in the above embodiment, the present invention is not limited thereto, but includes an electronic display device as long as it can display a plurality of screens related to respective measurements in parallel. For example, it may be an activity display device that displays elapsed time, number of walking steps, altitude, and the like in parallel.

Besides, the specific details of the components, control contents, display contents, display procedures, and the like described in the above embodiments can be appropriately modified without departing from the scope of the present invention.

Although several embodiments of the present invention have been described, the scope of the present invention is not limited to the above described embodiments and includes the scope of the present invention that is described in the claims and the equivalents thereof.

What is claimed is:

1. An electronic display device, comprising:
   measurement sensors that measure respective items;
   a digital display that displays the items; and
   a processor that determines a main image related to a measurement of at least one of the items and updates the main image at first timing, wherein,
   upon displaying the main image related to a measurement of an item other than the first item on the digital display, the processor determines that a sub image is related to a measurement of the first item, synchronizes the first timing with update timing that is related to the main image, for simultaneously updates the main image and the sub image.

2. The electronic display device according to claim 1, wherein
   the measurement sensors include a time counter that measures a current time as the first item, and,
   upon displaying a screen related to a measurement not by the time counter, a screen of the current time is the sub image.

3. The electronic display device according to claim 2, wherein
   an item corresponding to the main image is measured equal to or more than once a second.

4. The electronic display device according to claim 3, wherein
   the measurement sensors include a time measurement sensor that measures elapsed time as one of the items,
   upon measuring the elapsed time by the time measurement sensor, the processor determines that a screen related to the elapsed time is the main image, and
   upon stopping a measurement of the elapsed time, the processor determines that a screen related to the elapsed time is the sub image.

5. The electronic display device according to claim 4, wherein,
   upon stopping update of a screen that is related to an item during a measurement and that is the main image, the processor switches a screen related to the item during the measurement to the sub image.

6. The electronic display device according to claim 3, wherein
   the measurement sensors include a time measurement sensor that measures elapsed time as one of the items, and the processor updates a screen of the elapsed time and a screen of the current time each at a predetermined display time unit, and causes a predetermined mark to appear and disappear each for a predetermined update time unit that is shorter than the display time unit.

7. The electronic display device according to claim 6, wherein
the display time unit is one minute and the update time unit is one second.

8. The electronic display device according to claim 3, wherein,
upon stopping update of a screen that is related to an item during a measurement and that is the main image, the processor switches a screen related to the item during the measurement to the sub image.

9. The electronic display device according to claim 6, wherein,
upon stopping update of a screen that is related to an item during a measurement and that is the main image, the processor switches a screen related to the item during the measurement to the sub image.

10. The electronic display device according to claim 2, wherein
the measurement sensors include a time measurement sensor that measures elapsed time as one of the items,
upon measuring the elapsed time by the time measurement sensor, the processor determines that a screen related to the elapsed time is the main image, and
upon stopping a measurement of the elapsed time, the processor determines that a screen related to the elapsed time is the sub image.

11. The electronic display device according to claim 10, wherein,
upon stopping update of a screen that is related to an item during a measurement and that is the main image, the processor switches a screen related to the item during the measurement to the sub image.

12. The electronic display device according to claim 2, wherein
the measurement sensors include a time measurement sensor that measures elapsed time as one of the items, and
the processor updates a screen of the elapsed time and a screen of the current time each at a predetermined display time unit, and causes a predetermined mark to appear and disappear each for a predetermined update time unit that is shorter than the display time unit.

13. The electronic display device according to claim 12, wherein
the display time unit is one minute and the update time unit is one second.

14. The electronic display device according to claim 13, wherein,
upon stopping update of a screen that is related to an item during a measurement and that is the main image, the processor switches a screen related to the item during the measurement to the sub image.

15. The electronic display device according to claim 14, wherein,
upon stopping update of a screen that is related to an item during a measurement and that is the main image, the processor switches a screen related to the item during the measurement to the sub image.

16. The electronic display device according to claim 2, wherein,
upon stopping update of a screen that is related to an item during a measurement and that is the main image, the processor switches a screen related to the item during the measurement to the sub image.

17. The electronic display device according to claim 1, wherein
the measurement sensors include a time measurement sensor that measures elapsed time as one of the items,
upon measuring the elapsed time by the time measurement sensor, the processor determines that a screen related to the elapsed time is the main image, and
upon stopping a measurement of the elapsed time, the processor determines that a screen related to the elapsed time is the sub image.

18. The electronic display device according to claim 17, wherein,
upon stopping update of a screen that is related to an item during a measurement and that is the main image, the processor switches a screen related to the item during the measurement to the sub image.

19. The electronic display device according to claim 1, wherein,
upon stopping update of a screen that is related to an item during a measurement and that is the main image, the processor switches a screen related to the item during the measurement to the sub image.

20. A display control method of displaying, on a digital display, screens each related to respective items measured by measurement sensors, the method comprising:
determining a main image related to a measurement of at least one of the items and updating a screen at first timing; and
update controlling including, upon displaying the main image related to a measurement of an item other than the first item on the digital display, determining that a sub image is related to a measurement of the first item, synchronizing the first timing with update timing that is related to the main image, and simultaneously updating the main image and the sub image.

* * * * *

UNITED STATES PATENT AND TRADEMARK OFFICE
CERTIFICATE OF CORRECTION

PATENT NO. : 11,449,092 B2  
APPLICATION NO. : 16/824129  
DATED : September 20, 2022  
INVENTOR(S) : Kosuke Hasegawa Page 1 of 1

It is certified that error appears in the above-identified patent and that said Letters Patent is hereby corrected as shown below:

In the Claims

Column 11, Claim 8, Line 10 should read:  
8. The electronic display device according to claim 6, Column 11, Claim 9, Line 16 should read:  
9. The electronic display device according to claim 3, Column 12, Claim 15, Line 7 should read:  
15. The electronic display device according to claim 12, Signed and Sealed this  
Sixth Day of May, 2025

Coke Morgan Stewart  
*Acting Director of the United States Patent and Trademark Office*